(12) United States Patent
Ivey (10) Patent No.: US 7,673,414 B1
(45) Date of Patent: Mar. 9, 2010

(54) FISHING LOOP METHOD OF FISHING

(76) Inventor: Joseph M. Ivey, 11840 Country Club Dr., Panama City, FL (US) 32404

( * ) Notice: Subject to any disclaimer, the term of this patent is extended or adjusted under 35 U.S.C. 154(b) by 221 days.

(21) Appl. No.: 11/890,152

(22) Filed: Aug. 3, 2007

Related U.S. Application Data (60) Provisional application No. 60/837,763, filed on Aug. 15, 2006.

(51) Int. Cl.
*A01K 83/00* (2006.01)

(52) U.S. Cl. .......................... 43/4.5; 43/43.6
(58) Field of Classification Search .................. 43/43.6, 43/53.5, 4.5
See application file for complete search history.

(56) References Cited

U.S. PATENT DOCUMENTS

| | | | |
|---|---|---|---|
| 741,916 A | 10/1903 | Krus | |
| 1,869,293 A * | 7/1932 | Wolford | 43/43.6 |
| 2,570,468 A | 10/1951 | Matthes | |
| 2,592,727 A | 4/1952 | Pamer | |
| 2,597,679 A | 5/1952 | Schwarzer | |
| 2,679,708 A | 6/1954 | Matthes | |
| 2,710,481 A | 6/1955 | Matthes | |
| 2,792,664 A | 5/1957 | Schwarzer | |
| 2,828,573 A | 4/1958 | Larsen | |
| 2,853,827 A | 9/1958 | Schwarzer | |
| 2,995,860 A * | 8/1961 | Flagstad | 43/53.5 |
| 2,996,828 A * | 8/1961 | Williams, Jr. | 43/43.4 |
| 3,605,318 A * | 9/1971 | Santo et al. | 43/43.4 |
| 3,811,217 A | 5/1974 | Watkins | |
| 4,141,170 A * | 2/1979 | Fosher | 43/42.24 |
| 4,177,596 A | 12/1979 | Dillow | |
| 4,570,373 A | 2/1986 | Brief | |
| 4,864,766 A * | 9/1989 | Bohn | 43/42.37 |
| 4,907,364 A * | 3/1990 | Hedman | 43/42.39 |
| 4,924,618 A * | 5/1990 | McGahee | 43/43.6 |
| 5,855,089 A * | 1/1999 | Hockmeyer et al. | 43/42.37 |
| 6,032,402 A | 3/2000 | Jilling et al. | |
| 6,560,917 B2 | 5/2003 | Van Der Hoven et al. | |

OTHER PUBLICATIONS

U.S. Appl. No. 10/679,561 for Barbless Spring-Closure Fish Hook, filed Oct. 7, 2003, Joseph M. Ivey.

* cited by examiner

*Primary Examiner*—Son T Nguyen
*Assistant Examiner*—Marisa Conlon (57) ABSTRACT

A method of fishing that employs a fishing loop as the terminal tackle article that holds bait and interoperates with fish attractants. The fishing loop opens a gap urged by pressure between a gradual bend top and a loop closing extension to receive bait and allow fish flesh to pass. The gap closes after pressure is released holding the bait or engaged fish. The fishing loop has an elongated lever eye for securing fishing line. The lever eye also serves to help the loop stay closed under pressure from swimming fish. The fishing loop can be shaped from a single section of wire or rod; or, the loop closing extension can be a separate flexible material when rigidity in the fish engaging portion is desired. The fishing loop can be used with natural or penetrable artificial bait. A jig head slug or lure body with an opening sized to accommodate the fishing loop can also be used as a fish attractant in place of natural or penetrable artificial bait; wherein the structure of the opening is compatible with the fishing loop allowing it to operate effectively.

5 Claims, 4 Drawing Sheets

FISHING LOOP DEVICE

FISHING LOOP DEVICE

Fig. 1

FISHING LOOP INSERTED IN JIG HEAD

FISHING LOOP ASSEMBLY

Fig. 3

LURE BODY WITH CHAMBER FOR FISHING LOOP

FISHING LOOP METHOD OF FISHING

CROSS-REFERENCE TO RELATED APPLICATIONS

This application claims the benefit of provisional patent application Ser. No. 60/837,763, filed 2006 Aug. 15 by the present inventor.

Patent application Ser. No. 10/679,651 filed 7 Oct. 2003 by the present inventor for Barbless Spring-Closure Fish Hook Device, now abandoned.

FEDERALLY SPONSORED RESEARCH

Not Applicable

SEQUENCE LISTING OR PROGRAM

Not Applicable

BACKGROUND OF INVENTION

1. Field of Invention

This invention relates to fishing methods, specifically to use of a barbless terminal tackle fishing loop for engaging bait and fish and the fishing loop's interoperability with other compatible fishing tackle devices.

2. Prior Art

Fishing involves the activity of capturing fish for consumption as food, for sport, or both. A traditional method of fishing involves a hook to engage the fish, line attached to the hook on one end and attached to a pole or reel on the other end. When a fish is engaged with the hook the angler retrieves the hooked fish by raising the end of the pole attached to the line or cranking line onto the spool of a reel generally through eye openings attached to a fishing rod. When the hooked fish is close to the angler it is lifted from the water and removed from the hook to be stored for food or released back into the water.

To be effective the hook needs a sharp point to penetrate fish and a mechanism to prevent the fish from slipping off easily. Typically a barb is extended backward from the point of the hook and outward from the hook material to prevent premature release of the hooked fish. While barbed hooks thus constructed are somewhat effective for retaining fish there are several problems associated with their use. Removal of a barbed hook from a fish usually involves tearing fish flesh as the hook is extracted. Barbed hooks also pose a threat to anglers or other persons if one is accidentally pierced by a barbed hook. To remove an embedded barbed hook it must be either torn out of flesh (a painful experience); pushed through flesh until the barbed portion is exposed so the barbed portion can be clipped off and the hook slid out; or it can be surgically removed by cutting flesh sufficiently to extract the barb through the surgical opening. Other aggravations associated with barbed hooks include snagging of clothing, landing nets and other objects. Barbs snagged in objects are difficult to remove, consume time, and frequently cause damage to property.

Despite these and other objectionable results of use of barbed hooks, the barbed hook remains the staple terminal tackle for sports and commercial anglers because no viable alternative is currently on the market and available to anglers. The current invention was developed to fill that market void and make available to anglers a device and method of use of that device which will eliminate, minimize or ameliorate the ill effects of use of barbed hooks noted above. Various inventors and innovators have devised ways to relieve the inconvenience and disadvantages of use of barbed hooks. Some of those include making hooks with plain (barbless) points or altering hooks by filing off the barb or pinching the barb down against the hook material. These efforts eliminate or minimize the ill effects of barbs but render the hook ineffective as it lacks a mechanism for holding fish.

A number of other devices and ways to engage fish have been proposed. Many of these have appendages that cover, overlap or contact the hook at or around the point. Most with appendages are intended to deflect vegetation (weedless) and involve a barb as the fish holding mechanism. These are excluded as prior art since one object of the present invention is to overcome the disadvantages of barbs on hooks. Others with appendages are intended to shield persons from accidental piercing. Most such devices either have barbs or no fish holding capacity and have been excluded as prior art. Still other apparatus have been proposed with appendages that are complicated devices with various assembly components that are cumbersome and expensive to produce which probably accounts for an absence of such devices in the market place.

One such device is shown in U.S. Pat. No. 4,570,373 to Brief (1986) in which an appendage is formed of smaller diameter wire than the hook portion with the smaller wire wrapped around the hook shank or secured to the hook shank with a metal tab. The device is similar in intended function to the fishing loop of the present invention. However, it fails to provide a simple one-piece unitary construction, a lever eye to help hold fish, a continuously bent looping design, and would not be compatible with other items included in the fishing loop method of fishing. It could also malfunction if hook setting action or fish playing pressure caused the appendage to dislodge from the hook portion of the small wire allowing the mechanism to spring open prematurely.

Other devices have included spring arms like one embodiment of U.S. Pat. No. 2,996,828 to Williams (1961). The spring arm in this case is welded to a hook shank and the arm in its relaxed position has a sheath that covers the point such that it will tend to deflect objects or fish prior to contact with the point. That device can be expected to be expensive and time-consuming to produce as well as being less effective than the fishing loop at piercing the intended catch due to the deflecting effect of the point-covering sheath.

Some prior art exposes the concept of a spring opening hooking device with an arm that opens to engage fish and closes to hold the fish. Most, such as U.S. Pat. No. 2,710,481 to Matthes (1955) and U.S. Pat. No. 2,853,827 to Schwarzer (1958) involve complex assemblies. The Matthes device uses both a forward opening and closing mechanism and a side opening mechanism that rely on a slip ring to hold portions of the hook and arm together. The Schwarzer device has a separate wire component from the hook component that involves several wraps in two directions to produce the spring effect for opening and closing the device. Both would be heavy, cumbersome and expensive to produce which probably accounts for their absence in the marketplace. The fishing loop of the current invention is practical, economical to produce, and proven to be effective. Since the other components of the fishing loop method of fishing are specifically formed to interact with the fishing loop, use of any other apparatus would not be compatible or appropriate for the current invention.

An additional prior art item was the Barbless Spring-Closure Fish Hook Device, the preferred embodiment of the present inventor's patent application Ser. No. 10/679,651 filed 7 Oct. 2003 and referred to in the Cross Reference to Related Applications; now abandoned. That device has a similar purpose as the fishing loop device of the present application but lacks several features and some functionality of the fishing loop and would not be compatible or interoperable with the other components of the fishing loop method of fishing. The flattened part of the spring arm of that device that facilitates the spring function is clearly different from the opening and closing mechanisms of the fishing loop. That device also lacks a lever eye for aiding retention of fish. Additionally it relies on a traditional J shape with a straight shank rather than the continuously bending loop of the fishing loop which simplifies shaping from a strand of wire cut from a wire coil. And the referenced device does not provide for or anticipate the in-water release feature of the fishing loop device component of the present invention.

Fishing is a sport engaged in by millions of people and its popularity and participation continue to grow. Recent developments in fishing equipment and fish attractants have helped increase the likelihood that anglers will catch more of the available fish than in the past. An undesirable consequence of this success is depletion of fish stocks in fisheries. Numerous actions have been instituted to address depletion of fish including regulatory restrictions on the size and quantity of fish allowed to be kept, length of fishing season, areas where fishing is disallowed, etc. for many of the more popular fish species. These actions have helped minimize depletion and in some case helped restore some fish species.

Besides regulation, conservation and sports minded individuals and groups have contributed to the effort through publicity of fish mortality reduction activities such as catch and release encouragement and use of less lethal methods of catching fish. One contributor to less mortality and minimizing injury to fish is use of barbless hooks to replace barbed hooks. Barbed hook removal from fish has long been recognized as a major contributor to injury and mortality to fish released back into the water. Some regulators even ban use of barbs on hooks used in certain locations and for some species of fish.

Although hooks without barbs or with the barb removed can engage fish as well or better than their barbed counterparts, their absence of a fish retaining mechanism renders them significantly less effective at catching fish. A fish can easily slip off the non-barbed device unless constant and unrelenting pressure remains exerted on the engaged fish until landed; a daunting task since a fighting fish can change direction quickly, leap and shake violently, and thrash about in the water. Thus a barbless fish engaging device capable of holding the fish is desired to meet conservation and reduced mortality objectives as well as provide anglers with a reasonable likelihood of success at catching fish.

Prior art has also produced products that stress safety features to reduce the likelihood of accidental piercing and imbedding of hooks in human flesh. Most such features also deflect objects encountered by the devices including fish. U.S. Pat. No. 2,996,828 to Williams (1961) has several embodiments with the purpose of providing that protection. Such devices have a noble purpose of protecting people but sacrifice utility with regard to the devices' primary intended purpose of engaging fish. The fishing loop of the present invention addresses the safety issue by reducing the possibility of severe injury to humans while providing an effective means of engaging and holding fish.

OBJECTS AND ADVANTAGES

Accordingly, besides the objects and advantages of the fishing loop method of fishing described above, several objects and advantages of the present invention include:

(a) to provide an article of terminal fishing tackle that results in an effective means of catching fish without using a barb for retaining fish;

(b) to provide fish attractants that operate with the barbless fishing loop to enhance the fishing loop's effectiveness and enjoyment for the angler;

(c) to provide a method of fishing involving the fishing loop and cooperating fish attractants that is less traumatic for fish;

(d) to provide an article of terminal fishing tackle that is less of an injury hazard to persons than the barbed fish hook;

(e) to provide anglers a choice of fishing loop structure and size that conforms to the nature of the fish being targeted;

(f) to provide a means of adding weight to a fishing loop to facilitate casting and sinking where distance and depth are important considerations while fishing;

(g) to provide a way for a fishing loop and its cooperating lure body to operate together while being retrieved and to separate without losing either after a fish is engaged, allowing for easy dislodging of the fishing loop from the caught fish;

(h) to provide a method of releasing unwanted large fish and snagged objects without the loss of terminal tackle;

(i) to provide a way for a fishing loop to remain intact even when stress from pressure exerted by a swimming and thrashing engaged fish distorts the shape of the loop.

These objects and advantages will allow anglers to catch and release more fish in a less harmful way than with barbed hooks reducing fish injury and improving the rate of fish survival. They also will pose less hazard to humans decreasing trauma of painful hook removal. Barbed hook snags and resulting damage to property will be lessened as will loss of terminal tackle for anglers.

Consequently, the experience and enjoyment of fishing will be enhanced for the angler using the fishing loop method of fishing, while the impact on fish mortality from barbed hooks will be lessened. Still other objects and advantages will be apparent from consideration of the ensuing descriptions and drawings.

SUMMARY

A method of fishing employing a fishing loop and its interoperability with compatible fish attractants.

DRAWINGS

Figures

The inter-related products introduced here as part of the fishing loop method of fishing are.

DRAWINGS

Reference Numerals—Fishing Loop Device

Figure 1:
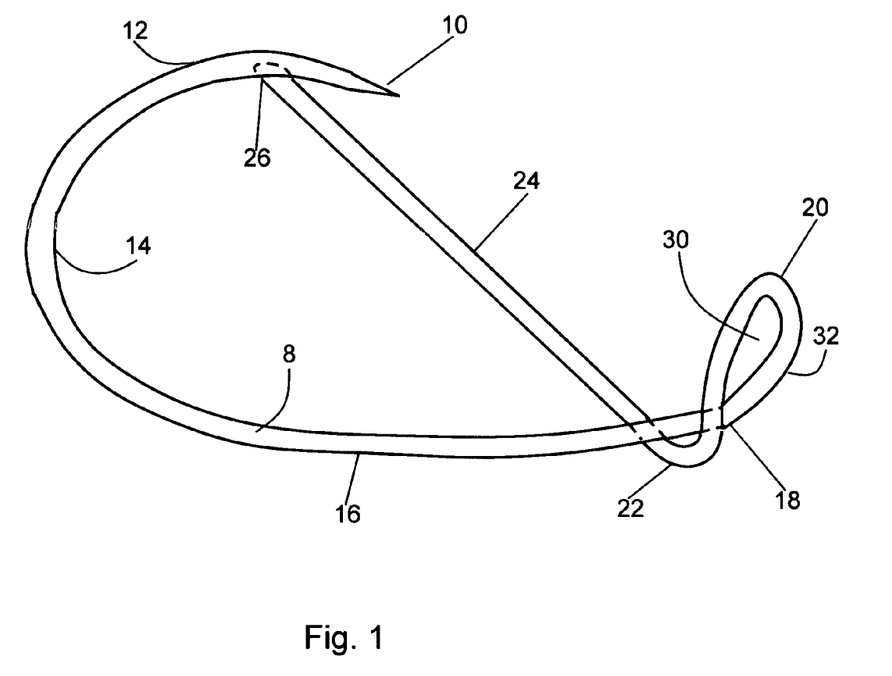
FIG. 1 illustrates a fishing loop device which is used in conjunction with live, natural or penetrable artificial bait. This device is also used in conjunction with a lure body as shown in FIG. 4.

The preferred embodiment is a fishing loop device 8 which is illustrated in FIG. 1 and has the following elements:
- 10 sharp point
- 12 gradual bend top
- 14 major bend
- 16 gradual bend bottom
- 18 angled bend
- 20 crimp bend
- 22 wrap bend
- 24 loop closing extension
- 26 loop end
- 30 eye
- 32 eye lever

DESCRIPTION

Fishing Loop Device

FIG. 1 is a side view of a fishing loop device 8. A section of wire or rod of predetermined length, diameter and material is shaped beginning with a sharp point 10 followed by a gradual bend top 12 yielding to a major bend 14 followed by a gradual bend bottom 16 that extends beyond the sharp point 10. There is an angled bend 18 followed closely by a crimp bend 20. The material is then wrapped over the angled bend 18 to form a wrap bend 22 directing the end of the material toward the middle of the gradual bend top 12 comprising a loop closing extension 24. The loop end 26 of the loop closing extension 24 is tapered and bent slightly inward to contact the gradual bend top 12, thus forming a closed loop. An eye 30 opening is formed between crimp bend 20 and wrap bend 22 wrapping over and in contact with angled bend 18. The configuration of material forming the eye 30 also creates an eye lever 32. Specific material length, diameter, point shape and bend curves will vary somewhat depending on the type and size of target fish but will generally be configured in accordance with the above description and accompanying drawing.

OPERATION

Fishing Loop Device

An angler uses the fishing loop device 8 as a substitute for a barbed fishing hook to hold bait and secure fish until the fish is intentionally released by the angler.

The angler attaches a terminal end of a fishing line to the fishing loop device 8 by passing the terminal end of the line through the eye 30 and tying the terminal end segment of line to the segment of line on the other side of the eye 30. The other end of the fishing line is either secured to a fishing pole or threaded through openings (eyes) attached to a fishing rod. Fishing rods generally have a fishing reel attached which can hold a considerable length of line tied to a spool then rolled onto the spool. Various mechanisms on different types of reels allow the angler to retrieve line onto the spool and dispense line off the spool. Most reels also have an adjustable mechanism called a drag which permits line to dispense when the pressure of a pull on the line at or toward the terminal end exceeds adjusted limits.

When preparing to fish with live, natural, or penetrable artificial bait, the angler secures a bait to the fishing loop device 8 by depressing the loop closing extension 24 toward the gradual bend bottom 16 thus creating a gap between the gradual bend top 12 and the loop end 26. Some mass of the bait is then penetrated with the sharp point 10 which is passed through the mass until the sharp point 10 is exposed. The penetrated portion of the bait is then slid past the juncture where the loop end 26 and the gradual bend top 12 touch when the fishing loop device 8 is in its relaxed state. The penetrated bait mass is slid toward or onto the major bend 14. Pressure exerted to depress the loop closing extension 24 is released restoring the loop to its closed state. The bait is thus secured on the closed loop unless it tears free or the fishing loop device 8 is opened under external force.

The secured bait, thus impaled on the fishing loop device 8 which is attached to the terminal end of the fishing line, is presented into water where fish may be present. If a fish attempts to consume the bait it will likely ingest the fishing loop device 8 with the bait. The angler should then exert pressure with a jerking or pulling motion on the fishing line causing the fishing loop device 8 to align with its sharp point 10 toward the mouth opening of the fish. Pressure will likely cause the sharp point 10 to engage fish flesh. Once the sharp point 10 engages and penetrates fish flesh, further pressure will likely cause the sharp point 10 to pass through some flesh. The passing fish flesh mass, along with pulling pressure by the angler on the fishing line, will force the loop closing extension 24 to bend toward the gradual bend bottom 16 allowing the punctured fish flesh mass to slide over the gradual bend top 12 onto the major bend 14. After the mass passes the area where the gradual bend top 12 and the loop end 26 abut when the fishing loop device 8 is in its relaxed state, the cleared mass will relieve pressure on the loop closing extension 24 allowing it to restore to its closed state with the loop end 26 touching the gradual bend 12, thus closing the gap and securing the fish to the fishing loop device 8. The fish thus secured is pulled toward the angler by exerting pressure on the fishing line.

Pressure on the major bend 14 caused by an engaged swimming fish or the weight of the fish being lifted from the water will cause some degree of change in the bend of the major bend 14 thus increasing the distance between the gradual bend top 12 and the gradual bend bottom 16. The structure of the bends that form the eye 30 help prevent the bend changes to the major bend 14 from creating a gap in the fishing loop device 8 through which a secured fish might escape. Any outward pressure on the major bend 14 will result in pressure against the eye lever 32. Pressure on the eye lever 32 will cause the angled bend 18 to become a less severe angle thereby causing a lifting of the loop closing extension 24; which lifting will help keep the loop end 26 in contact with or in proximity to the gradual bend top 12. That will eliminate or decrease any gap that would result from pressure on the major bend 14 thereby decreasing any opportunity for the secured fish to escape through the gap.

When a fishing pole is used the angler exerts pressure by raising the tip of the pole to which the fishing line is secured thereby lifting the secured fish from the water. Fishing poles are generally employed in targeting small fish which are unlikely to exert enough swimming pressure to deform an appropriate size fishing loop device 8.

When a rod and reel are used the angler uses a combination of raising the rod tip and retrieving line rolling it onto the reel spool until the secured fish is close enough to be lifted from the water. Rod and reel anglers target all sizes of fish. The structure of the fishing loop device 8 is especially suited to rod and reel angling. When the fishing loop device 8 of appropriate size is matched with an appropriate reel, reel drag setting, and fishing line strength, an enhanced means of fishing is experienced.

The angler selects the fishing loop device 8 with sufficient resistance to deformation in the major bend 14 to accommodate the type of fish targeted. The reel drag setting is adjusted to dispense line under slightly less pressure than the deformation pressure point for the major bend 14. The strength of the fishing line is selected to withstand more pressure than the amount needed to deform the major bend 14, decreasing any likelihood of the swimming fish breaking the line and escaping with the fishing loop device 8 permanently imbedded in its flesh.

The angler plays the fish by retrieving fishing line rolling it onto the reel spool when swimming pressure does not exceed the drag resistance setting and allowing line to dispense off the spool when pressure exceeds the drag setting. The fish is played until it tires sufficiently to offer minimum resistance at which time it can be brought close to the angler and lifted from the water. The fishing loop device 8 is then removed from the fish by depressing the loop closing extension 24 and backing the sharp point 10 out of the punctured fish flesh with the fish flesh mass passing through a gap created between loop end 26 and the gradual bend top 12 by depressing the loop closing extension 24. The angler can then retain the fish or release it back into the water with only a small puncture wound received during its encounter with the fishing loop device 8.

An additional feature of the fishing loop device 8 is the angler's ability and option to release a fish or other engaged object before retrieving it from the water. If a secured fish or other object is heavy enough or there is sufficient pressure exerted to deform the major bend 14 the angler can intentionally cause a deformation of the major bend 14. This is accomplished by increasing the reel drag resistance beyond the amount of pressure required for deformation and exerting enough pull to cause a straightening of the major bend 14. When sufficient straightening has occurred the gradual bend top 12 and the sharp point 10 will slip out of the penetrated fish flesh or other mass thereby detaching the fishing loop device 8 from the unwanted object. This is especially useful when large unwanted fish are engaged or obstacles are snagged. The angler can then retrieve the deformed fishing loop device 8, restore the major bend 14 to its original shape and resume fishing without losing terminal tackle or wasting time playing unwanted fish or trying to detach from snagged objects.

DRAWINGS

Reference Numerals—Fishing Loop Inserted in Jig Head

Figure 2:
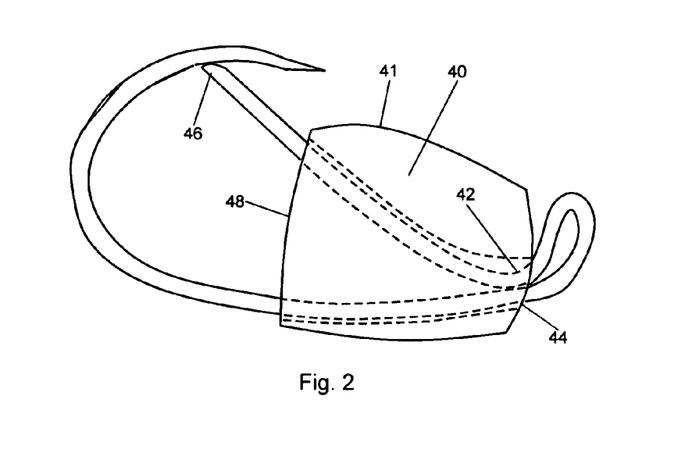
FIG. 2 illustrates another embodiment of a fishing loop that is inserted in a specially formed jig head that operates with this fishing loop structure.

Another embodiment is a fishing loop inserted in jig head 40 as illustrated in FIG. 2. The elements of the fishing loop portion are the same as those in the fishing loop device 8 illustrated in FIG. 1 except the wrap bend 22 is replaced with an inside touching bend 42 and the loop end 26 is replaced with a loop end 46.

Added elements for the fishing loop inserted in jig head 40 are:

41 jig head slug
42 inside touching bend
44 front jig opening
46 loop end
48 rear jig opening
49 jig channel

DESCRIPTION

Fishing Loop Inserted in Jig Head

FIG. 2 is a side view of the fishing loop inserted in jig head 40.

Figure 2A:
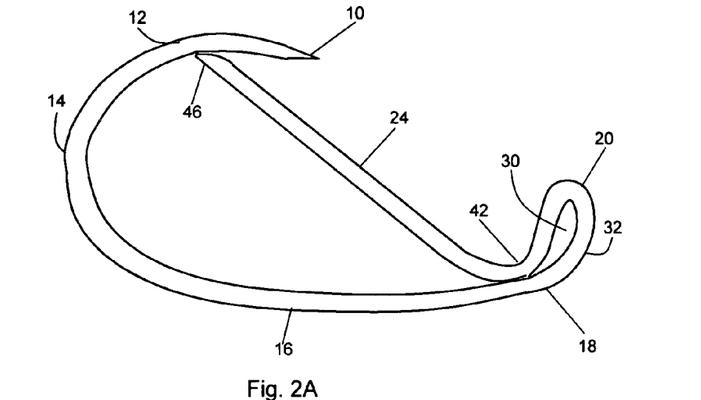

FIG. 2A illustrates the fishing loop portion which is a section of wire or rod that, in its completed stage, forms a closed loop.

Figure 2B:
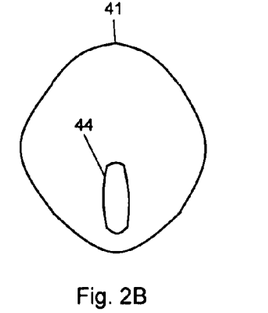

FIG. 2B is a front view of a jig head slug 41 with an oblong narrow front jig opening 44 sufficient to accommodate the fishing loop portion at its inside touching bend 42 and narrow enough vertically to prevent the loop portion from rotating inside the slug portion. The slug can be any material that is heavier than water such as, but not limited to, metal, glass, ceramic, resin, etc. molded or fabricated with the openings and channel described here. The slug may be painted or decorated as desired by the producer to be attractive to anglers and/or fish.

Figure 2C:
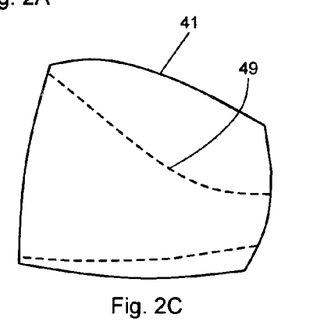

FIG. 2C is a side view of the jig head slug 41 that depicts a jig channel 49 that passes through the length of the slug and widens vertically as it approaches the rear of the slug.

Figure 2D:
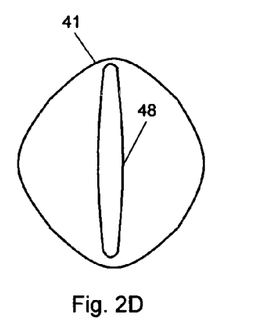

FIG. 2D is a rear view of the jig head slug 41 that depicts an oblong rear jig opening 48 that is considerably deeper from top to bottom than the front jig opening 44 and approximately the same width as the front and channel open spaces.

The fishing loop inserted in jig head 40 is constructed as follows:

- Mold or fabricate the jig head slug as depicted in FIGS. 2B, 2C and 2D.
- Cut a strand of wire or rod of sufficient length and sharpen one end for the sharp point 10.
- Make the crimp bend 20, the angle bend 18 and the inside touching bend 42.
- Exert pressure on the loop closing extension 24 and gradual bend bottom 16 to depress the angle at the inside touching bend 42 until the loop end 46 touches the gradual bend bottom 16.
- While holding the loop end 46 and gradual bend bottom 16 together, insert the sharp point 10 in the front of the slug and push the point out the rear jig opening 48. Push the compressed loop closing extension 24 and gradual bend bottom 16 through the jig slug until the angle bend 18 prevents further insertion. Release pressure allowing the loop closing extension 24 to restore to its original angle.
- Form the major bend 14 by bending the material around until the gradual bend top 12 remains in contact with the loop end 46.
- Taper the loop end 46 slightly downward.

OPERATION

Fishing Loop Inserted in Jig Head

An angler uses the fishing loop inserted in jig head either without attachments (if appropriately adorned to attract fish) or with attached live, natural, or penetrable artificial bait as fish attractants. The weight of the jig head slug facilitates casting greater distances and allows the lure and/or bait to drop in the water if desired by the angler. The device can be bumped along the bottom to attract bottom feeding fish, retrieved further up in the water column for suspended fish, or retrieved quickly across the top if the angler chooses.

The manner of attaching and holding bait, securing fish, and disengaging fish is the same as with the fishing loop device 8 in FIG. 1.

DRAWINGS

Reference Numerals—Fishing Loop Assembly

Figure 3:
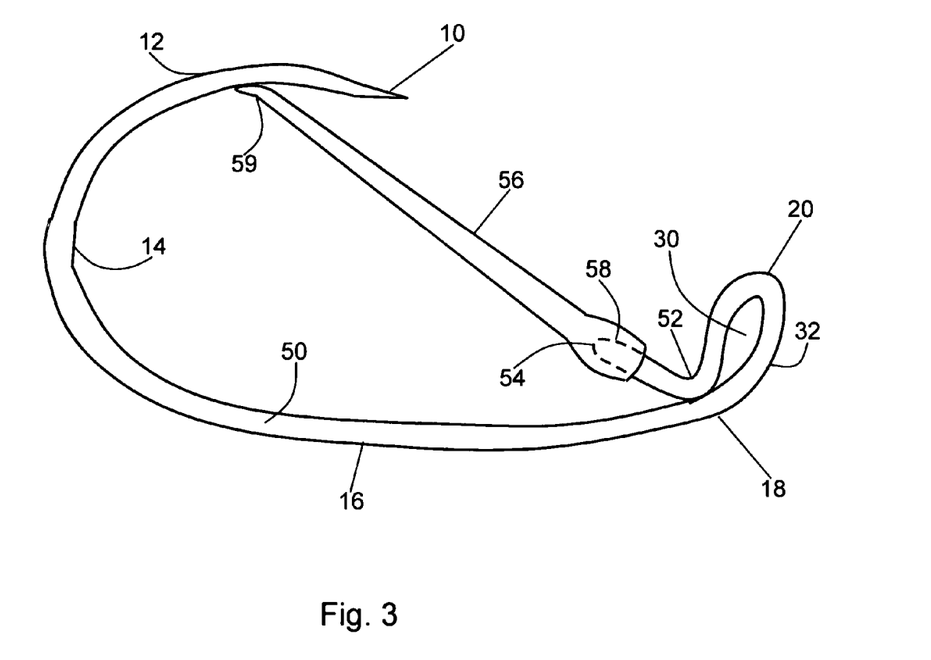
FIG. 3 illustrates another embodiment as a fishing loop assembly which uses an alternative material as the portion of the loop that opens and closes the loop.

Yet another embodiment is a fishing loop assembly 50 as illustrated in FIG. 3.

The elements of the fishing loop assembly 50 are the same as the fishing loop device 8 as illustrated in FIG. 1 except the wrap bend 22 is replaced with an inside touching bend 52 and the wire or rod terminates shortly thereafter in an extension holding stub 54. Additionally the loop closing extension 24 and loop end 26 are replaced with a different material other than the wire or rod used in FIG. 1.

Added elements for the fishing loop assembly 50 are:
- 52 inside touching bend
- 54 extension holding stub
- 56 loop closing attachment
- 58 stub receiver
- 59 loop end

DESCRIPTION

Fishing Loop Assembly

FIG. 3 is a side view of a fishing loop assembly 50. The metal portion is formed by sharpening and bending a section of wire or rod as illustrated. The metal portion terminates with a short section which serves as an extension holding stub 54 pointing toward the gradual bend top 12. A section of flexible material such as springy plastic or monofilament fluorocarbon serves as a loop closing attachment 56 which extends from just beyond the inside touching bend 52 to the gradual bend top 12 where it ends with a tapered loop end 59. The loop closing attachment 56 has a stub receiver 58 cavity shaped to fit snugly onto the extension holding stub 54. An adhesive can be applied to hold the stub and extension firmly together.

The metal portion of this embodiment is normally more rigid and heavier gauge material than is used for the fishing loop device 8 in FIG. 1. This embodiment's metal portion may also be tempered, forged or both to add to its strength and rigidity. Because it is stronger and more rigid, a less rigid and springier material is needed for the loop closing portion.

OPERATION

Fishing Loop Assembly

This embodiment is used and operates in the same way as the fishing loop device 8 in FIG. 1 except that the strength and rigidity makes it unlikely that fish can be released by deformation of the major bend 14. The fishing loop assembly 50 is used in fishing environments where fish need to be hoisted quickly and forcibly from the area where engagement occurs. It is also used for the largest and strongest of fishes.

DRAWINGS

Reference Numerals—Lure Body with Chamber for Fishing Loop

Figure 4:
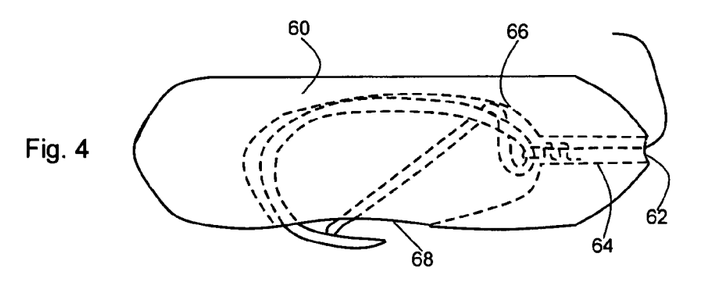
FIG. 4 illustrates a fishing lure body equipped with a chamber and channel in which a fishing loop is fitted and strung with line to operate together.

A component of the fishing loop method of fishing associated with the fishing loop device 8 of FIG. 1 and the fishing loop assembly 50 of FIG. 3 is a lure body with chamber for fishing loop 60 illustrated in FIG. 4. The lure body can be any shape, size, material and decor desired by the producer as long as there is sufficient material to accommodate a chamber into which a fishing loop can be implanted as described below. The lure body can be fabricated or molded from any of a variety of materials and can have other attachments such as skirts, lips, eyes, etc.

The elements for the lure body with chamber for fishing loop 60 are:
- 62 front opening
- 64 channel
- 66 cavity
- 68 bottom opening

DESCRIPTION

Lure Body with Chamber for Fishing Loop

FIG. 4 is a side view of the lure body with chamber for fishing loop 60 which shows a fishing loop device 8 implanted appropriately with a fishing leader tied to the loop's lever eye and strung through the lure body where it can be attached to fishing line.

Figure 4A:
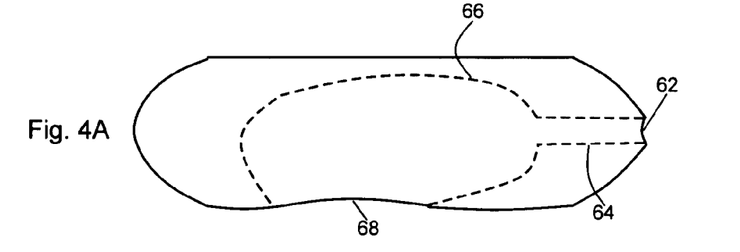

FIG. 4A is a side view of the lure body prior to implanting the fishing loop device and leader.

Figure 4B:
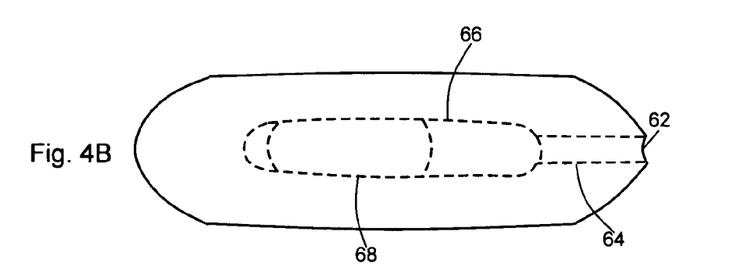

FIG. 4B is a top view of the lure body.

Figure 4C:
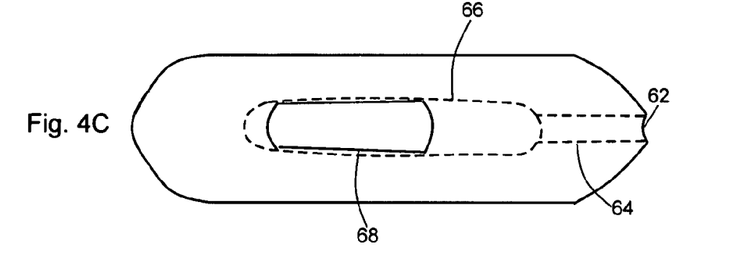

FIG. 4C is a bottom view of the lure body.

Figure 4D:
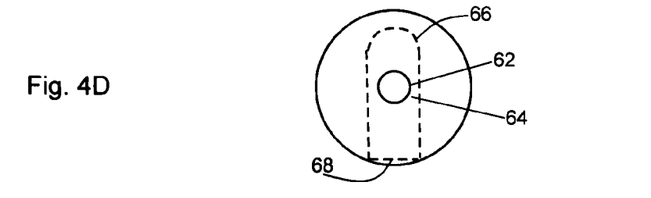

FIG. 4D is a front view of the lure body.

The lure body with chamber for fishing loop 60 is constructed by drilling, fabricating or molding a front opening 62 and channel 64 in the front of the lure body. The channel enters a cavity 66 that is shaped to accommodate a predetermined size fishing loop device 8 or fishing loop assembly 50. The cavity 66 is milled, molded or fabricated in the lure body with the bottom portion of the cavity sloping toward a bottom opening 68. The length of the cavity 66 is slightly longer than the predetermined fishing loop to be used. The depth of the cavity 66 from top to bottom opening 68 is slightly less than the distance from the gradual bend bottom 16 of the fishing loop to its sharp point 10. The width of the cavity 66 is uniform and slightly more than the widest portion of the fishing loop device 8 which is its wrap bend 22; or, if a fishing loop assembly 50 is used, the widest portion of the assembly which is the outside diameter of the stub receiver 58. The bottom opening 68 is shorter than the cavity 66 and of sufficient length to allow the eye lever 32 and wrap bend 22 or stub receiver 58 to pass freely in and out of the bottom opening 68.

OPERATION

Lure Body with Chamber for Fishing Loop

The angler may obtain the lure body with chamber for fishing loop 60 either as a lure separate from the fishing loop or with the fishing loop and attached leader preimplanted.

If obtained separately, the angler ties a leader end to the lever eye of the fishing loop, passes the free end of the leader through the bottom opening 68, the cavity 66, the channel 64, and out the front opening 62. The angler then tugs the free end of the leader to pull the fishing loop into the cavity 66 and snugs the lever eye to the front of the cavity where it meets the channel 64, leaving the sharp point 10 and a small portion of the gradual bend top 12 exposed outside the bottom opening of the lure body. The free end of the leader is then attached to the fishing line secured to the angler's tackle.

The angler presents the lure into water where fish may be present. When a fish attempts to consume the lure it will generally engulf the lure in its mouth and close its mouth. The angler, sensing a bite, tugs the line causing the lure to attempt to exit the fish through its mouth. The exposed sharp point of the implanted fishing loop will likely engage part of the fish as the lure attempts its exit from the fish. Further tugs by the angler will cause deeper penetration of the sharp point in the fish causing the back of the fishing loop to release from its snug position inside the lure cavity. Afterwards the lure body will usually be regurgitated by the fish causing the lure body to ride forward along the leader toward the angler. This activity allows the penetrated fish flesh to cause the fishing loop to secure the fish as previously described.

In addition to the benefits and advantages of fishing loops previously described, the angler now may procure and transport lure body and fish securing apparatus separately as opposed to having hooks permanently affixed to each lure.

DRAWINGS

Reference Numerals—Fishing Loop Pliers

Another component of the fishing loop method of fishing is the jaws portion of a pair of pliers shaped and grooved to facilitate disengaging a fishing loop from a caught fish. The handles and hinge portion of the pliers can be any of a number of conventional pliers levering and hinging apparatus and are not considered part of the invention.

Elements of the fishing loop pliers 70 are:
72 conventional pliers handles and hinge
74 right angled jaw
76 right angled jaw
78 perpendicular grooves
79 parallel grooves

RAMIFICATIONS AND SCOPE OF INVENTION

Accordingly, the reader will see that the fishing loop method of fishing offers the angler an enhanced fishing experience having several advantages over conventional fishing methods. Any of the above embodiments of fishing loops holds bait and secures fish without the aggravations and damaging effects of barbs, particularly where barbed hook removal is concerned. The invention also allows anglers to conserve fishing tackle by intentional release from unwanted fish and snags as well as being able to restore the shape of a fishing loop that has been deformed. The angler can procure terminal tackle separately from lure bodies and change fish attractants while using the same fishing loop rather than buying lures with dedicated hooks attached. And, because the lever eye helps hold fish on the fishing loop, the likelihood of success at catching fish is enhanced. Consequently, availability of the fishing loop method of fishing will make fishing a more enjoyable, economical and environmentally friendly pursuit.

While the above descriptions contain many specificities, these should not be construed as limitations on the scope of the invention, but rather as exemplifications of embodiments thereof. Many other variations are possible. For example, the fishing loops can have many sizes and be made of various materials with various colors. The interoperable jig head slugs and lure bodies can be any size, shape and material that allows a fishing loop to be inserted as specified. The slugs and lure bodies can be decorated with a single or multiple colors and various designs to attract fish and anglers. Accordingly, the scope of the invention should be determined not by the embodiments illustrated, but by the appended claims and their legal equivalents.

I claim:
1. A method of fishing, comprising:
(a) providing a fishing loop for engaging and securing fish, comprising: a one-piece continuous gradually bending single section of wire or rod having a sharp point at one end, wherein said sharp point has a circumference, said one-piece continuous gradually bending single section of wire or rod consisting of a gradual bend top, a major bend, a gradual bend bottom, an eye lever, a crimp bend, a wrap bend, and a loop closing extension; wherein said gradual bend top, said major bend, said gradual bend bottom, said eye lever, said crimp bend, said wrap bend, and said loop closing extension create a closed loop leaving said sharp point exposed along the entire said circumference of said sharp point; wherein said eye lever and said crimp bend create an upwardly angled and elongated eye opening extending from said gradual bend bottom in said closed loop; wherein said loop closing extension extends from said wrap bend towards said gradual bend top, wherein said loop closing extension is biased to directly abut and engage said gradual bend top such to close said closed loop, such that when said loop closing extension is urged under pressure, said loop closing extension is detached away from said gradual bend top so as to create a gap in said loop; whereby bait can be held and fish can be secured without employing a barb; (b) outwardly bending said one-piece continuous gradually bending single section of wire or rod from said sharp point towards said gradual bend top and continuing to arcuately bend said one-piece continuous gradually bending single section of wire or rod outwards and downwards to create said major bend, then bending said one-piece continuous gradually bending single section of wire or rod downwards and inwards to create said gradual bend bottom; (c) then extending said gradual bend bottom, (d) then arcuately bending said gradual bend bottom upwardly to form an eye lever, (e) then bending said eye lever to create a crimp bend, (f) then downwardly extending said one-piece continuous gradually bending single section of wire or rod from said crimp bend to below said gradual bend bottom to create a wrap bend, (g) then bending said wrap bend upwards towards said gradual bend bottom, (h) then extending said one-piece continuous gradually bending single section of wire or rod from said wrap bend back above said gradual bend bottom and towards said gradual bend top to create said loop closing extension, (i) then terminating said loop closing extension at said gradual bend top such that said loop closing extension directly abuts and engages said gradual bend top at a distance away from said sharp point; (j) then providing a fish attractant that cooperates with said fishing loop and entices fish to consume said fish attractant along with said fishing loop, (k) then attaching said elongated eye of said fishing loop to a terminal end of a fishing line, (l) then attaching an opposite end of said fishing line to a fishing pole or fishing reel spool, (m) then presenting said fish attractant and cooperating fishing loop into water where fish may be present, (n) then exerting pressure on said fishing loop through said fishing line to engage a fish with said sharp point when said fish attempts to ingest said fish attractant, (o) then applying sufficient pressure on said fishing loop to cause said loop closing extension to open said gap through which said fish flesh passes allowing said loop closing extension to restore to its relaxed position thereby closing said gap, enclosing a portion of said fish in said fishing loop, (p) then pulling said fish to a position where said fish or said fishing loop can be grasped and held securely, (q) then exerting pressure on said loop closing extension thereby opening said gap between said loop closing extension and said gradual bend top allowing said sharp point to be slidingly removed freeing said fish from said fishing loop, and (r) then returning said freed fish to the water or keeping said fish for consumption.

2. The method of fishing of claim 1 wherein said fish attractant is live, natural or penetrable artificial bait that is impaled on said fishing loop with a portion of the bait surrounded by said fishing loop.

3. The method of fishing of claim 1 wherein said fish attractant is a jig head slug having a jig channel shaped to fit said fishing loop in which said fishing loop is housed leaving the elongated eye opening and the sharp point exposed.

4. The method of fishing of claim 1 wherein said fish attractant is a lure body containing a chamber in which said fishing loop snugly fits with said sharp point exposed to engage fish.

5. The method of fishing of claim 1 wherein said upward angled and elongated eye opening is surrounded by an eye lever that cooperates to elevate said loop closing extension when forward pressure is applied to said eye lever thereby helping to keep the loop end in contact with or close proximity to its adjacent portion.

* * * * *